April 20, 1965     J. HARTZ     3,179,903
PUSH-PULL AMPLITUDE MODULATOR
Filed March 8, 1961
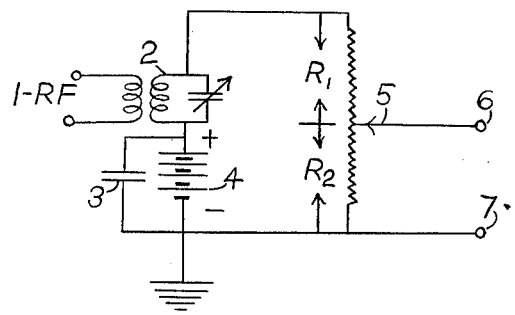
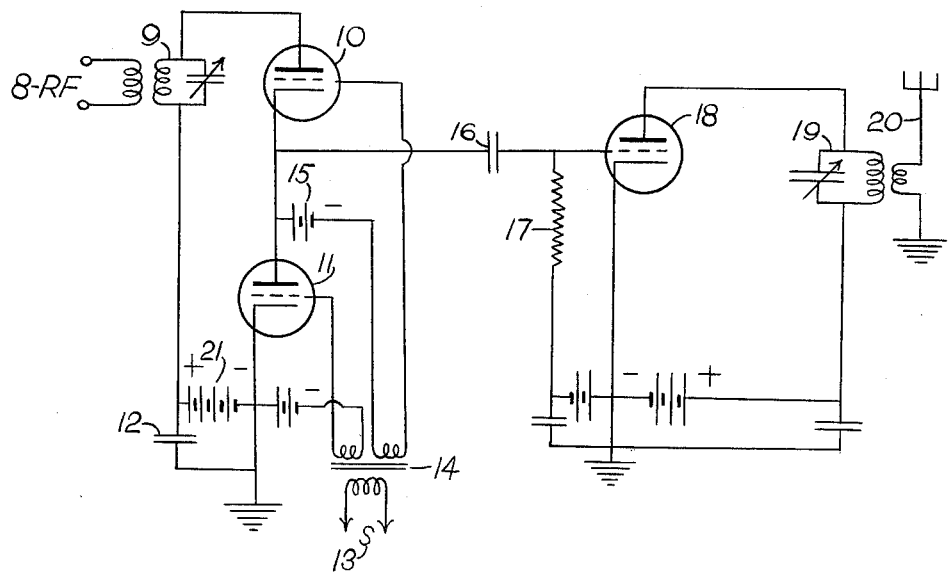
*INVENTOR.*

United States Patent Office 3,179,903
Patented Apr. 20, 1965

3,179,903
PUSH-PULL AMPLITUDE MODULATOR
Julius Hartz, 301 Shrewsbury Court, New Orleans, La.
Filed Mar. 8, 1961, Ser. No. 94,296
3 Claims. (Cl. 332—43)

This invention relates to a method of carrier wave modulation on a narrowed bandwidth, and the resulting change in the means of reception. Specifically, it describes the use of a class-A electronic voltage divider to continuously modulate the voltage of a sine wave, which voltage variations are then impressed upon a class-A power amplifier.

Further explanation can best proceed in connection with the drawings, in which:

FIG. 1 is a mechanically modulated voltage divider, used to illustrate and simplify the explanation of the mode of operation.

FIG. 2 is a circuit diagram of a modulated electronic voltage divider and power amplifier.

FIG. 1 illustrates a mechanical voltage divider. Reference numeral 1 is a source of RF excitation voltage, feeding through transformer 2 to the divider consisting of resistors $R_1$ and $R_2$ in series. 3 is an RF bypass. 4 is a D.C. battery voltage also in series with the divider. The slider 5 is moved at the modulating rate and the resulting voltage modulations at connectors 6 and 7 may be measured with a vacuum tube voltmeter or viewed upon an oscilloscope.

When the slider 5 is moved at the modulating rate, the values of $R_1$ and $R_2$ change, but the total value of the resistance never changes. When two tubes are connected in series and operated class-A, the total series resistance of the tubes never changes, but when the signal modulates the grid voltage of the two tubes in push-pull fashion, it causes their internal resistance to vary inversely as illustrated.

In the case of the mechanical voltage divider, it is to be noted that it can independently divide just the A.C. or just the D.C., or, as illustrated, it can divide both A.C. and D.C. simultaneously. This latter statement is most important because an electronic voltage divider cannot divide an A.C. independent of a D.C. In the mechanical voltage divider the resistors are always linear, but in an electronic divider the internal resistances of the tubes are not linear unless the tubes are operated class-A, which is the linear portion of the characteristic.

In FIG. 2 reference numeral 8 is a source of RF excitation voltage, feeding through transformer 9 to the plate of tube 10. Tubes 10 and 11 are connected in series and correspond to resistors $R_1$ and $R_2$ previously described. 12 is an RF bypass. 13 is a signal modulating source which push-pull (differentially) modulates the grid voltage of tubes 10 and 11 through transformer 14. 15 is a C-battery for biasing tube 10 class-A. The reason for calling attention to this special battery is because it cannot be grounded as is conventional for all the other B and C supplies shown. Since no power can be taken from a voltage divider circuit without upsetting its linear operation, the resulting voltage variations are fed through condenser 16 and grid leak resistor 17 to the grid of tube 18, which is a class-A power amplifier feeding power variations through the tuned circuit 19 to the antenna 20. Attention is called to the fact that B-battery 21 must deliver twice the voltage which it is desired to impress upon the individual plates of tubes 10 and 11 because they are in series. All tubes in the system are biased class-A.

When the amplitude is varied by use of a class-C amplifier, as is now conventional, the current and voltage are varied proportionally and flow for an average of about 135 degrees of time. In the system being described the current remains constant, while the voltage is modulated continuously throughout the entire 360 degrees of each cycle. Because the current is continuous, the power variations are linear, whereas by the class-C system the power variations are non-linear and follow the square law, or they are the square of the linear variations. The mathematical inference is that a modulation by my system should require a bandwidth which is the square-foot of the bandwidth required by the present system.

At the present time, whenever a receiver is designed to receive a signal S, its bandwidth must be such that it can tune in all frequencies from F plus S to F minus S where "F" is the carrier frequency and "S" is the signal or modulating frequency. In the future, whenever a receiver is designed to receive the same signal S, but its bandwidth is less than that required to do so by the present system, such a receiver is making use of the knowledge and method herein revealed and should, therefore, be covered by this patent.

Triodes were shown in the drawing, but any tube or device using the principle illustrated is meant to be included.

I claim the following:

1. An amplitude modulating system which, in accordance with a signal modulating voltage, continuously and linearly varies an output carrier voltage during the entire 360 degrees of the carrier cycle, while keeping the direct current constant and leaving the alternating carrier current unmodulated at all times, which comprises a push-pull modulator stage including a pair of electron tubes serially connected across a source of anode supply voltage and also across a source of radio frequency carrier voltage, each of said tubes having at least a cathode, a control grid and an anode, means, including a split secondary audio transformer and suitable biasing batteries to bias the tubes class-A, for supplying a signal modulating voltage in opposite phase to the said control grids; an output connection including a coupling capacitor extending from the junction of the series-connected electron tubes for deriving a signal modulated carrier voltage of the nature initially recited and passing this voltage on to the negatively biased grid of an amplifier tube.

2. The basic discovery of a linear electronic voltage divider, which comprises a pair of tubes each having at least an anode, a cathode and a control grid, the cathode of one tube being connected to the anode of the second tube, which tubes are serially connected across a source of anode supply voltage and also across a source of radio frequency carrier voltage, but which are push-pull connected to the signal modulating voltage by means of a split secondary audio transformer, and suitable biasing batteries to bias the tubes class-A, so as to supply the modulating voltage in opposite phase to the said control grids, the said tubes functioning as inverse variable resistors in which the total series resistance never varies, in consequence of which neither the direct current nor the carrier alternating current ever vary; an output connection extending from the junction of the series-connected tubes, including a coupling capacitor, from which is derived the signal modulated carrier voltage.

3. The basic discovery of an electronic voltage divider which linearly modulates a carrier voltage for 360 degrees of the carrier cycle while keeping the direct current constant and leaving the carrier alternating current unmodulated at all times, comprising a pair of controllable-resistance electron discharge devices connected in series across a source of unidirectional anode supply voltage, and also in series with a source of radio frequency carrier voltage, each of said devices having at least a cathode, a control grid and an anode, means, including a split secondary audio transformer and suitable batteries to bias the grids class-A, for supplying a signal modulating voltage in opposite phase to the said control grids, which produces similar inverse variation of the internal resistance of the devices, due to the class-A bias, such that the total series resistance never varies, hence both the direct and alternating currents are always constant; an output connection extending from the junction of the series connected devices, including a coupling capacitor, from which is derived the signal modulated carrier voltage.

References Cited by the Examiner

UNITED STATES PATENTS

| | | | |
|---|---|---|---|
| 2,545,788 | 3/51 | McIntosh | 332—43 |
| 2,645,710 | 7/53 | Hartz | 332—43 |
| 2,794,077 | 5/57 | Olson | 332—64 |
| 2,929,026 | 3/60 | Walker | 330—117 |

ROY LAKE, *Primary Examiner.*

ROBERT H. ROSE, ALFRED L. BRODY, *Examiners.*